United States Patent [19]

Schrader

[11] 4,171,891
[45] Oct. 23, 1979

[54] DISTANCE-ADJUSTING MECHANISM FOR BELLOWS CAMERA

[75] Inventor: Goetz Schrader, Frankfurt am Main, Fed. Rep. of Germany

[73] Assignee: Plaubel, Feinmechanik & Optik GmbH, Frankfurt am Main, Fed. Rep. of Germany

[21] Appl. No.: 831,267

[22] Filed: Sep. 7, 1977

[30] Foreign Application Priority Data

Sep. 8, 1976 [DE] Fed. Rep. of Germany ....... 2640369

[51] Int. Cl.² .................. G03B 3/00; G03B 17/04
[52] U.S. Cl. ................................. 354/187; 354/195
[58] Field of Search ................. 354/187, 192–194, 354/195, 162, 163, 166–168

[56] References Cited

U.S. PATENT DOCUMENTS

| 2,333,737 | 11/1943 | Parr | 354/195 |
| 2,726,585 | 12/1955 | Faulhaber | 354/187 |
| 3,398,666 | 8/1968 | Mamiya et al. | 354/195 |

FOREIGN PATENT DOCUMENTS

| 772195 | 10/1934 | France | 354/162 |
| 5920 | of 1890 | United Kingdom | 354/194 |

*Primary Examiner*—John Gonzales
*Attorney, Agent, or Firm*—Montague & Ross

[57] ABSTRACT

A bellows camera has a housing movably connected with its lens mount by a scissor linkage including two pairs of intersecting arms on opposite sides of the lens mount, a first arm of each pair having one end pivoted to the housing and the opposite end guided in a slot on the lens mount whereas a second arm of each pair has one end pivoted to the lens mount and the opposite end guided in a slot on the housing. The slot-guided ends of the two second arms are engaged by respective rack members, slidable at right angles to the optical axis, which are in mesh with a pair of pinions on a common shaft traversing the housing and carrying a setting knob. If the knob is rotated beyond a limiting position of an operating range, corresponding to focusing on infinity, the rack members are cammed out of engagement with their respective scissor arms to enable manual collapsing of the camera.

8 Claims, 5 Drawing Figures

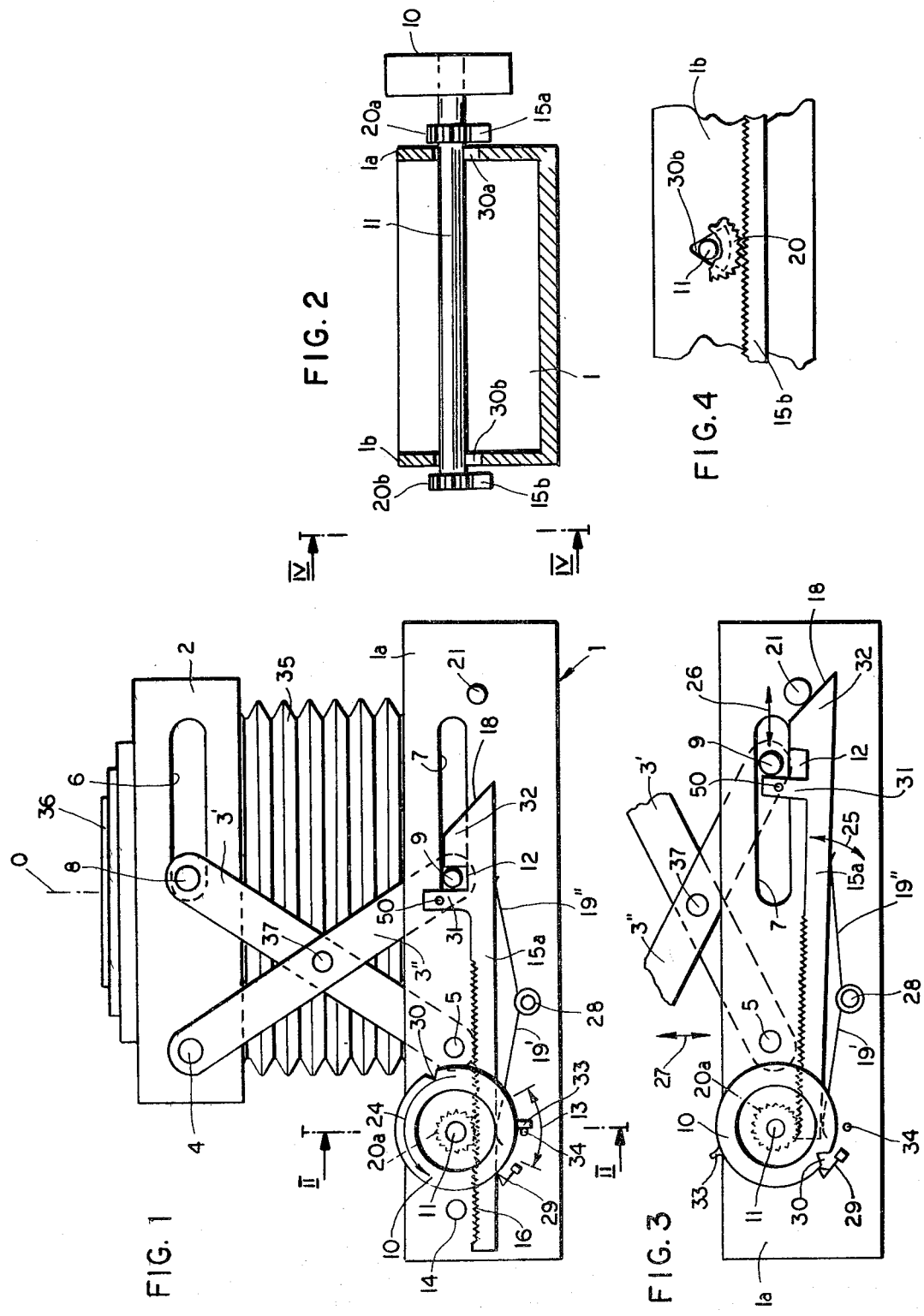

DISTANCE-ADJUSTING MECHANISM FOR BELLOWS CAMERA

FIELD OF THE INVENTION

My present invention relates to a photographic camera of the collapsible type whose housing, designed to accommodate a film to be exposed, is connected with a movable lens mount, carrying the exposure objective, through an extendible linkage allowing the distance of the objective from the film plane to be adjusted for focusing purposes by varying the separation of the lens mount from the housing. Generally, a bellows is inserted between the lens mount and the housing to form a lighttight enclosure between the objective and the film chamber.

BACKGROUND OF THE INVENTION

The extendible linkage normally used on such a bellows camera comprises a pair of scissor links or lazy-tongs on opposite sides of its optical axis, e.g. at the top and at the bottom. Conventional devices for varying the distance of the lens mount from the camera housing usually coact with only one of these scissor links, which does not permit very accurate focusing. Other normal types of adjusting mechanisms, carried on the lens mount, coact with both scissor links but are somewhat difficult to manipulate.

One of the mechanical problems involved is the decoupling of the adjusting mechanism from the scissor links for the purpose of facilitating a collapsing of the camera, i.e. a retraction of the lens mount into the housing. In principle, of course, a scissor linkage could be driven beyond the normal focusing range (i.e. past the "infinity" position) to reduce the spacing of the lens mount and housing to almost zero. In practice, however, such a retraction of the lens mount through the articulated linkage is cumbersome and time-consuming, as is the subsequent re-extension of the lens mount for another round of picture-taking.

OBJECTS OF THE INVENTION

The general object of my present invention, therefore, is to provide a simplified and precise adjusting mechanism for the focusing of a bellows camera.

A more particular object is to provide a mechanism of this type which automatically decouples itself from an articulated linkage upon movement past a limiting operating position, thereby facilitating the collapsing of the linkage and thus of the camera.

SUMMARY OF THE INVENTION

In accordance with my invention, a focusing mechanism mounted on a camera housing coacts with two symmetrical sections of an articulated linkage connecting that housing with an associated lens mount, these sections lying on opposite sides of the optical axis of an objective carried by the lens mount.

More particularly, the focusing mechanism according to my invention comprises a shaft traversing the housing on a line skew to that axis and in a plane perpendicular thereto. This shaft carries a pair of coupling elements such as pinions meshing with respective rack members for moving them parallel to each other, and to the aforementioned transverse plane, to drive the associated linkage sections. Each rack member has a coupling formation, such as a slot between a pair of prongs, engageable with a coacting formation on an arm of an associated scissor link.

Advantageously, each rack member is laterally swingable about a point of contact with the corresponding pinion to disengage its coupling formation from the coacting formation upon moving past the limiting position at the "infinity" end of the operating range, such disengagement being brought about by a stationary deflector on the housing which cams the rack aside against the force of a biasing spring tending to keep the two formations engaged. The force of that biasing spring can be used, pursuant to a further feature of my invention, to press the shaft into firmer contact with a wedge-shaped lodgment therefor, the resulting braking effect preventing a spontaneous rotation of the shaft in the collapsed state of the camera. When a knob or other actuator on the shaft returns the racks to their range of operating positions, they automatically re-engage the associated scissor arms.

BRIEF DESCRIPTION OF THE DRAWING

The above and other features of my invention will now be described in detail with reference to the accompanying drawing in which:

FIG. 1 is a diagrammatic plan view of a bellows camera provided with a focusing mechanism embodying my invention;

FIG. 2 is a cross-sectional view taken on the line II—II of FIG. 1;

FIG. 3 is a view of the lower part of FIG. 1 showing the camera in an alternate position;

FIG. 4 is a sectional detail view taken on the line IV—IV of FIG. 2 but drawn to a larger scale.

SPECIFIC DESCRIPTION

Figure 5:
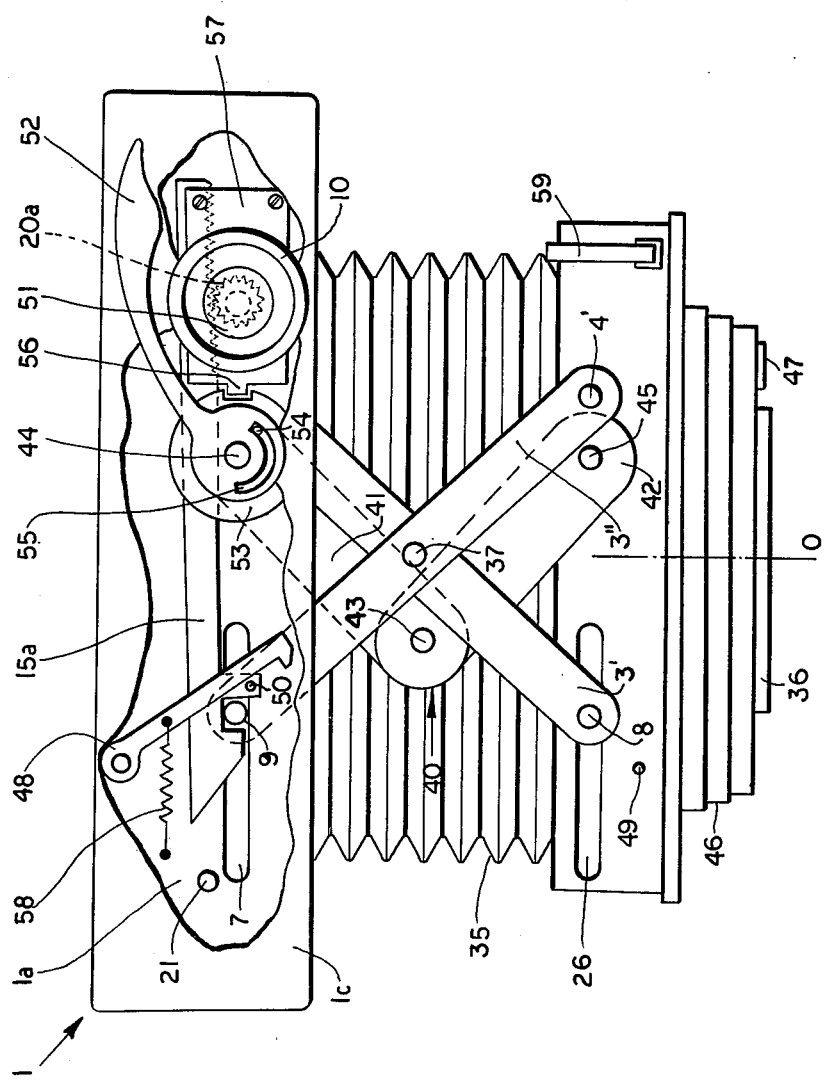
FIG. 5 is a view generally similar to FIG. 1 but showing additional details of the camera.

In the drawing I have shown a collapsible camera comprising a housing 1 and a lens mount 2 interconnected by a bellows 35 as well as by an articulated linkage which includes two pairs (only one shown) of scissor arms 3', 3" pivotally interconnected at 37. Another part of that linkage, shown only in FIG. 5, is a knee joint 40 formed from a pair of legs 41, 42 of equal length interconnected by a hinge pin 43, leg 41 being pivotable on housing 1 about the axis of an input shaft 44 whereas leg 42 is similarly pivotable on lens mount 2 about the axis of an output shaft 45. The legs of knee joint 40 serve as carriers for a gear train forming part of a mechanical transmission for the operation of a shutter associated with an objective 36 whose optical axis is shown at O and which is disposed on a lens board 46 also accommodating a window 47 for an electric eye of a photometer. The construction of the knee joint 40 and of the associated gear train is described and illustrated in my copending application Ser. No. 831,279 of even date whose disclosure is hereby incorporated by reference into the present application.

Arms 3', 3" constitute a scissor link forming one section of the articulated linkage, inserted above axis O between housing 1 and lens mount 2, a nonillustrated replica of that scissor link being disposed on the bottom of the camera below bellow 35. Arm 3' has one end articulated to housing 1 by a pivot pin 5 and carries at its opposite end a pin 8 which is slidable in a guide slot 6 of lens mount 2. In an analogous manner, arm 3" has one end articulated to lens mount 2 by a pivot pin 4 and carries at its opposite end a pin 9 slidable in a guide slot 7 of housing 1.

A vertical shaft 11 traverses the housing 1, at a location laterally offset from optical axis O, and carries at its top a focusing knob 10 serving to control the scissor linkage 3', 3". Shaft 11 is provided at its top and bottom extremities with a pair of pinions 20a and 20b meshing with respective rack members 15a and 15b which are provided with teeth 16 over part of their length and are slidable along upper and lower walls 1a, 1b of housing 1. It is to be noted that these walls lie within an external envelope 1c which is partly shown in FIG. 5 and has not been illustrated otherwise. Only the upper rack 15a, which is visible in FIGS. 1, 3 and 5 and which of course is also representative of its mate 15b, will be described hereinafter.

An untoothed end of rack 15a remote from pinion 20a carries a pair of prongs 31 and 32 separated by a gap 12 fitting closely about the pin 9 guided in slot 7 of wall 1a. A hairpin spring with legs 19' and 19", embracing a fixed stud 28, bears upon the back of rack 15a at two locations, i.e. opposite its point of contact with pinion 20a and in the vicinity of prong 31. With lens mount 2 extended as shown in FIG. 1, the camera is in operating position and can be focused upon objects at distances ranging from infinity to closeup. Within that operating range, rack 15a lies parallel to slot 7 as well as to the major sides of housing 1 and is positively coupled with scissor arm 3" via pin 9; rack 15b, of course, is concurrently in similar engagement with the other scissor link. The movement of the rack is determined solely by its contact with pinion 20a, pin 9 and spring 19', 19"; thus, the rack is free to swing out laterally against the spring force upon reaching the right-hand limit of its stroke when a stud 21 on housing wall 1a strikes a camming edge 18 forming the outer flank of prong 32 to deflect the rack from its linear path (arrow 25). Such deflection, illustrated in FIG. 3, decouples the arm 3" from the rack 15a by removing the shorter prong 32 from registry with slot 7, the longer prong 31 continuing to span that slot so as to prevent the pin 9 from moving to the left of its position illustrated in FIG. 3. As indicated by an arrow 26, pin 9 can now travel freely within the right-hand section of slot 7 to allow the complete collapse of the camera, with retraction of lens mount 2 into the housing as indicated by an arrow 27. This retraction of the lens mount can be carried out rapidly by hand, possibly against the force of a nonillustrated compression spring tending to re-extend the lens mount. A latch 48, FIG. 5, may then hold the lens mount withdrawn by engaging a coacting pin 49 thereon; as long as the rack 15a occupies the operating position of FIG. 1, the latching mechanism is disabled by a pin 50 on prong 31 which blocks the clockwise swing of the latch under the control of a biasing spring 58 into its locking position. This feature is more fully described and claimed in my copending application Ser. No. 831,272 of even date whose disclosure is hereby incorporated by reference into the present application.

Knob 10, rotatable with shaft 12 over an arc of more than 180° as indicated by an arrow 24, has a peripheral notch 30 releasably engageable by an indexing spring 29 at the instant when the camera is focused on infinity. i.e. just before the stud 21 begins to decouple the rack 15a from the pin 9 in the manner illustrated in FIG. 3. Thus, the user will know that the limit of the operating range has been reached but will nevertheless be able to go beyond that range by overcoming the indexing force of spring 29. At the opposite end of the range, a lug 33 on knob 10 comes to rest against a stop 34 to prevent further leftward movement of rack 15a; this stop could be omitted if the extreme closeup position is sufficiently indicated by the engagement of pin 9 with the left-hand end of slot 7.

As further illustrated in FIG. 5, a pushbutton 51 is axially seated within knob 10 to serve as a trigger for the release of the shutter after the same has been cocked with the aid of a wind-up lever 52 which is freely rotatable on input shaft 44 and is linked with the gear train of knee joint 40 via a lost-motion coupling connecting it with a disk 52 on shaft 44, that coupling including a pin 54 on the disk engaging in a semicircular slot 55 on a hub portion of lever 52. In the cocked position of the shutter, a tongue 56 of a leaf spring 57 engages in a peripheral notch of disk 53 to immobilize same, that tongue being disengageable upon depression of the pushbutton 51 as more fully described in my copending application Ser. No. 831,265 of even date whose disclosure is likewise hereby incorporated by reference in the present application. A finger 59 on lens mount 2 comes to lie under the leaf spring 59 in the collapsed position to prevent any untimely depression thereof.

Whenever the user wants to resume the taking of pictures, a clockwise rotation of knob 10 from the position of FIG. 3 to or past the indexed "infinity" position will release the latch 48 so that the lens mount 2 is re-extended, manually or by spring force, with pin 9 snapping back into the gap 12 by momentarily camming aside the prong 32 before coming to rest against prong 31.

As illustrated in FIGS. 2 and 4, shaft 11 is journaled in housing walls 1a and 1b with the aid of a pair of bearings 30a and 30b forming wedge-shaped lodgments therefor, the wedges pointing away from the corresponding racks 15a and 15b. Normally, racks 15a and 15b are held under moderate pressure by their respective spring legs 19' so that the shaft 11 is lightly wedged into its lodgments 30a and 30b. When, however, the racks are swung out as shown in FIG. 3, the outward deflection of spring leg 19" intensifies the pressure of spring leg 19' so that the shaft is more tightly gripped by its bearings, thereby resisting displacement from its decoupling position. Proper meshing engagement between the racks and their pinions is, of course, insured in all positions by this arrangement.

I claim:

1. A camera comprising:

a housing adapted to receive a photographic film to be exposed;

a lens mount provided with an objective centered on an optical axis, said lens mount being receivable in said housing in a collapsed position and being axially sparable therefrom for movement into a picture-taking position;

a bellows forming a lighttight enclosure between said lens mount and said housing;

an articulated linkage connecting said lens mount with said housing, said linkage being divided into two symmetrical sections on opposite sides of said axis; and a focusing mechanism on said housing coacting with both said sections for varying the axial separation of said lens mount from said housing, said mechanism including a shaft skew to said axis traversing said housing in a plane perpendicular to said axis, an actuator on said shaft, a pair of pinions secured to said shaft at opposite extremities thereof, and a pair of parallel rack members respectively in mesh with said pinions and movable parallel to said plane.

2. A camera as defined in claim 1 wherein said sections comprise a pair of scissor links each including a first arm with one end pivoted to said housing and a second arm with one end pivoted to said lens mount, said first arm having its other end guided in a slot on said lens mount, said second arm having its other end guided in a slot on said housing, each of said rack members having a coupling formation engageable with a coacting formation on said other end of said second arm of the respective scissor link.

3. A camera as defined in claim 2 wherein each of said rack members is laterally swingable about a point of contact with the respective pinion to disengage said coupling formation from said coacting formation, further comprising deflecting means on said housing for laterally swinging each rack member upon movement thereof past a limiting operating position, thereby decoupling said actuator from said scissor links and facilitating a collapsing of said linkage.

4. A camera as defined in claim 3 wherein said rack members are provided with respective biasing springs tending to keep said coupling and coacting formations engaged, each of said biasing springs having a first leg which bears upon the respective rack member in the vicinity of said point of contact and a second leg which bears upon the respective rack member in the vicinity of said coupling formation.

5. A camera as defined in claim 4, further comprising bearing means forming a pair of wedge-shaped lodgments around said shaft in proximity to said pinions, said lodgments pointing away from said pinions, disengagement of said coupling and coacting formations by said deflecting means stressing said second leg to intensify the biasing force exerted by said first leg through the respective rack member and pinion upon said shaft for wedging same more firmly into said lodgments to prevent spontaneous rotation of said shaft.

6. A camera as defined in claim 3 wherein said deflecting means comprises a pair of studs on said housing engageable in said limiting operating position with a pair of camming surfaces on the respective rack members, said coacting formation being a pin, said coupling formation being a long prong and a short prong separated by a gap for bracketing said pin in an engaged position, said long prong being located between said gap and said point of contact for intercepting said pin upon re-extension of the collapsed linkage.

7. A camera as defined in claim 6 wherein said short prong has a flank averted from said long pin constituting the respective camming surface, thereby facilitating re-entry of said pin into said gap upon re-extension of said linkage.

8. A camera as defined in claim 3 wherein said mechanism includes indexing means for yieldably arresting said actuator in said limiting operating position and stop means for preventing a movement of said actuator beyond an opposite extreme position.

* * * * *